United States Patent [19]

Nishida et al.

[11] Patent Number: 4,954,379
[45] Date of Patent: Sep. 4, 1990

[54] INFORMATION RECORDING THIN FILM AND METHOD FOR RECORDING INFORMATION

[75] Inventors: Tetsuya Nishida, Koganei; Motoyasu Terao, Tokyo; Yasushi Miyauchi, Sakai; Shinkichi Horigome, Tachikawa, all of Japan

[73] Assignee: Hitachi, Ltd., Tokyo, Japan

[21] Appl. No.: 368,060

[22] Filed: Jun. 14, 1989

Related U.S. Application Data

[63] Continuation of Ser. No. 946,843, Dec. 29, 1986, abandoned.

[30] Foreign Application Priority Data

Dec. 27, 1985 [JP] Japan .................................. 60-292635

[51] Int. Cl.$^5$ .............................................. B32B 3/02
[52] U.S. Cl. ........................................ 428/64; 428/65; 428/209; 428/457; 428/913; 346/76 L; 346/135.1; 369/288; 430/945
[58] Field of Search ................... 428/64, 65, 209, 457, 428/913; 346/76 L, 135.1; 369/288; 430/945

[56] References Cited

U.S. PATENT DOCUMENTS

| | | | |
|---|---|---|---|
| 3,530,441 | 9/1970 | Ovshinsky | 430/31 |
| 4,238,803 | 12/1980 | Terao et al. | 430/945 |
| 4,348,461 | 9/1982 | Terao et al. | 428/688 |
| 4,499,178 | 2/1985 | Wada et al. | 428/689 |
| 4,621,032 | 11/1986 | deNeufville | 428/688 |
| 4,637,976 | 1/1987 | Terao et al. | 430/523 |
| 4,656,079 | 4/1987 | Yamada et al. | 430/945 |
| 4,659,588 | 4/1987 | Yamada et al. | 427/42 |
| 4,668,573 | 5/1987 | Terao et al. | 428/688 |
| 4,670,345 | 6/1987 | Morimoto et al. | 430/945 |

*Primary Examiner*—Patrick Ryan
*Attorney, Agent, or Firm*—Antonelli, Terry, Stout & Kraus

[57] ABSTRACT

An information recording thin film capable of changing an atomic configuration upon exposure to a recording beam, formed on a substrate directly or through a protective layer composed of at least one of inorganic materials and organic materials, an average composition in the film thickness direction of the information-recording thin film being represented by the following general formula;

$$A_X B_Y C_Z Ge_\alpha Te_\beta$$

wherein X, Y, Z, $\alpha$ and $\beta$ are in ranges of $0 \leq X < 30$, $0 \leq Y \leq 30$, $0 \leq Z \leq 65$, $0 \leq \alpha \leq 65$, $10 \leq Z + \alpha \leq 65$ and $35 \leq \beta \leq 60$ in atomic percentage, C is at least one element of Sb, Sn, As, Pb, Bi, Zn, Cd, Si, Al, Ga and In; B is at least one element of Tl, halogen elements and alkali metal elements, and A is at least one of other elements than those represented by B and C, and than Ge and Te.

52 Claims, 1 Drawing Sheet

INFORMATION RECORDING THIN FILM AND METHOD FOR RECORDING INFORMATION

This application is a continuation of application Ser. No. 06/946,843, filed Dec. 29, 1986 now abandoned.

BACKGROUND OF THE INVENTION

This invention relates to an information-recording thin film capable of recording frequency modulated analog signals such as images, voices, etc. or digital information such as electronic computer data, facsimile signal, digital audio signal, etc. in real time by a recording beam, such as laser beam, electron beam, etc., and to a method for recording information on the thin film.

There are various principles of recording on a thin film by a laser beam. Record based on changes in atomic configuration such as phase transition (which may be also called "phase change") of film material, photo-darkening, etc. brings about no substantial deformation of the film, and thus has such an advantage that a two-side disk can be obtained by directly bonding two disks. Furthermore, rewriting of recording is possible by properly selecting a composition. Many inventions of such recording have been so far made, and one of the earliest ones is disclosed in U.S. Pat. No. 3,530,441, where many thin films of Te—Ge, As—Te—Ge, Te—O, Te—O, etc. are mentioned. Japanese Patent Publication No. 54-41902 discloses various film compositions such as $Ge_{20}Tl_5Sb_5Se_{70}$, $Ge_{20}Bi_{10}Se_{70}$, etc., and Japanese patent application Kokai (Laid-open) No. 57-24039 discloses films of $Sb_{25}Te_{12.5}Se_{62.5}$, $Cd_{14}Te_{14}Se_{72}$, $Bi_2Se_3$, $Sb_2Se_3$, $In_{20}Te_{20}Se_{60}$, $Bi_{25}Te_{12.5}Se_{62.5}$, CuSe and $Te_{33}Se_{67}$. However, all of these prior art thin films have disadvantages when used as once-writable (write-once) or rewritable (reversible) phase transition recording films, such as low crystallization speed, less absorption of semiconductor laser beam and consequent poor sensitivity, inadequate reproduced signal intensity, poor stability of the amorphous state and poor oxidation resistance. Accordingly there have been problems in their practical applications.

SUMMARY OF THE INVENTION

An object of the present invention is to provide an information-recording thin film with good recording and reproducing characteristics, high sensitivity and high stability, and a method for recording information by such a thin film.

This object and other objects can be attained with an information-recording thin film capable of changing an atomic configuration upon exposure to a recording beam, formed on a substrate directly or through a protective layer composed of at least one of inorganic materials and organic materials, the average composition in the film thickness direction of the information-recording thin film being represented by the following general formula:

$$A_X B_Y C_Z Ge_{60} Te_\beta$$

wherein X, Y, Z α, and β are in ranges of $0 \leq X < 30$, $0 \leq Y \leq 30$, $0 \leq Z \leq 65$, $0 \leq \alpha \leq \gamma$, $10 \leq Z + \alpha \leq 65$, and $35 \leq \beta \leq 60$ in atomic percentage, C is at least one element of Sb, Sn, As, Pb, Bi, Zn, Cd, Si, Al, Ga and In; B is at least one element of Tl, halogen elements such as I, etc. and alkali metal elements such as Na, etc.; and A is at least one of other elements than those represented by B and C, and than Ge and Te, and by a method for recording information on the said thin film.

DETAILED DESCRIPTION OF PREFERRED EMBODIMENTS

Figure 1:
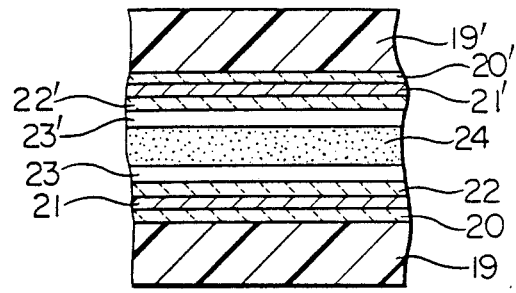
FIG. 1 and FIG. 2 are cross-sectional views of structures of recording members according to embodiments of the present invention.

The element represented by C in the general formula can effectively increase the stability of the amorphous state.

The element represented by B can cut the chain form atomic configuration of Te in Te-containing materials and can effectively enhance the crystallization speed. However, it lowers the crystallization temperature and may impair the stability of the amorphous state unless it is added to materials of higher crystallization temperature.

The element represented by A is at least one element other than the elements than Te and Ge and than the elements represented by C and B, for example, at least one element of Cu, Ag, Au, Sc, Y, Ti, Zr, V, Nb, Cr, Mo, Mn, Fe, Ru, Co, Rh, Ni, Pd, Hf, Ta, W, Ir, Pt, B, C, N, P, O, S, Se, lanthanide elements, actinide elements, alkaline earth metal elements, rare gas elements, etc.

One element or a plurality of elements from Ge, Te and those represented by B and C can be deemed as group A elements, as long as other elements of the individual groups B and C have been already used. For example, As can be added to a Tl—Sb—Ge—Te system in an amount of less than 30 at. % of As and in such a range that the sum total of As content and Sb content be less than 65 at. % of the upper limit of the content of the group C elements. Among these elements, it is preferable that the content of Hg, alkaline earth metal elements and inert gas elements be less than 10 at. %.

The composition of the present recording thin film may be changed in the film thickness direction, as long as the average composition in the film thickness direction is kept within the aforementioned range, and it is preferable that the composition changes continuously.

Transition elements such as Co, etc. represented by A can facilitate absorption of long wavelength light such as semi-conductor laser beam, etc., and can also effectively increase the recording sensitivity and enhance the crystallization temperature and, consequently, the stability of the amorphous state. The elements themselves have a higher melting point than 600° C., or can form compounds of higher melting point, and thus undergo no melting when elevated to a high temperature in crystallization by a laser beam. Thus, the high speed crystallization can be attained.

The present information-recording thin film within the aforementioned composition range has a distinguished recording and reproducing characteristics with a low power laser beam for recording and erasing and also has good stability.

More preferable ranges for X, Y, Z, α and β are as follows:

(a) $0 \leq X < 20$, $0 \leq Y \leq 10$, $0 \leq Z \leq 20$, $0.85 \leq \alpha/\beta < 1$
(b) $0 \leq X < 20$, $0 \leq Y \leq 10$, $0 \leq Z \leq 20$, $1 < \alpha/\beta \leq 1.15$ (c) $0 \leq X < 30$, $0 \leq Y \leq 25$, $5 \leq Z \leq 65$, $40 < Z+\alpha \leq 65$, $35 \leq \beta < 55$ (d) $1 \leq X < 30$, $0 \leq Y \leq 25$, $40 < Z+\alpha \leq 60$, $35 \leq \beta < 60$, and (e) $\beta/\alpha \neq 1$, $1 \leq X \leq 20$, $1 \leq Y \leq 10$, $40 < Z+\alpha \leq 60$, $35 \leq \beta \leq 85$ Particularly preferable ranges are as follows:

In (a) or (b), $X = Y = Z = 0$
In (c), $X = Y = 0$
In (d) and (e), $40 < \alpha \leq 60$
In (d) and (e), $0.85 \leq \alpha/\beta < 1$ or $1 < \alpha/\beta \leq 1.15$,
In (d) and (e), $5 \leq Z \leq 20$
In (e), $2 \leq Y \leq 10$ Among the elements represented by C, Sb is particularly preferable, Sn is next preferable, As, In and Si are then preferable, and then Pb, Bi and Ga are preferable.

Among the elements represented by B, Tl is particularly preferable, I is next preferable, and then Na is preferable.

Changes in the contents of individual elements in the film thickness direction are usually small, and the presence even of any patternwise change is not objectionable. With respect to Se and S, it is preferable that the contents of Se and S are increased in the neighborhood of one of the boundaries of a recording thin film (including a boundary to another layer), as compared with those at the inside, and the oxidation resistance can be increased thereby.

Ge and the element represented by C such as Sb, etc. and Te can stably maintain the amorphous state when contained in appropriate ratios. For example, a ratio of Ge to Te by atom is preferably in a range of 1:0.5 to 1:2. It is also preferable that A is at least one element of Co, Ni, Ti, V, Cr, Mn, Cu, Pd, Rh, Ru, Zr, Nb, Mo, Ag, Pt, Os, Ir, Hf, Ta, W, Re, and Au.

It is particularly preferable that $1 \leq X \leq 25$, $1 \leq Y \leq 20$ and a ratio of Ge to Te by atom is in a range of 1:0.85 to 1:1.2.

In a ratio of Ge to Te by atom of about 1:1, partial precipitation takes place by repetitions of recording and erasing, reducing the possible number of rewritings. By addition of the element represented by A such as Co, Ti, etc. the occurrence of the precipitation can be prevented, increasing the possible number of rewritings. Among the elements represented by A, Co is particularly preferable, Ti and Ni are next preferable, V and Cr are then preferable, and Pd, Zr, Nb and Mn are then preferable. It is preferable that a ratio of Sb or Bi to Te by atom is in a range of 1:0.4 to 1:1.4, a ratio of Sn or Si to Te by atom is in a range of 1:1.2 to 1:2.5, a ratio of As to Te by atom is in a range of 1:0.9 to 1:4, and a ratio of In to Te by atom is in a range of 1:0.5 to 1:2. In addition, Se and S are preferable, because they can increase the oxidation resistance, and their content is preferably less than 30% by atom.

It is preferable that at least one side of the present recording film is tightly covered and protected with other material, and it is more preferable to protect the two sides. The protective layer may be composed of a synthetic resin (organopolymer compound) plate such as acrylic resin plate, polycarbonate plate, epoxy resin plate, etc. which serve also as a substrate, or organic materials such as acrylic resins, epoxy resins, polyimides, polyamides, polystyrene, polyethylene, etc., or may be composed of inorganic materials containing oxides, fluorides, nitrides, sulfides, carbides, borides, boron, carbon or metals as the main component, or may be composed of their composite materials.

It is preferable that at least one of the protective layers adjacent to the recording film is composed of inorganic compounds. A substrate composed of glass, quartz, sapphire, iron, titanium, or aluminum as the main component can work as an inorganic protective layer. Among the organic and inorganic materials, tight covering with the inorganic materials is preferable with respect to the heat resistance. However, a thicker inorganic material layer (excluding the application as a substrate) is liable to cause at least one of crack development, decrease in transmissivity, and decrease in sensitivity, and thus it is preferable to tightly cover the opposite side of the inorganic material layer to the recording film side with a thicker organic material layer to increase the mechanical strength. The organic material layer may be a substrate. Deformation can be reduced thereby. The organic materials for use to this end include, for example, polystyrene, polycarbonate, epoxy resin, polyimides, polyamides, ethylene-vinyl acetate copolymer, known as hot-melt adhesives, etc. and tackifying agents, etc. UV light curing resin may be used. A protective layer composed of inorganic materials can be formed as such by electron beam deposition, sputtering, etc. or can be more readily formed by reactive sputtering, or by forming a film composed of at least one element of metals, semi-metals and semiconductors, and reacting the film with at least one of oxygen, sulfur and nitrogen. Inorganic material protective layers are composed of, for example, oxides of at least one element selected from the group consisting of Ce, La, Si, In, Al, Ge, Pb, Sn, Bi, Te, Ta, Sc, Y, Ti, Zr, V, Nb, Cr, and W, sulfides or selenides of at least one element selected from the group consisting of Cd, Zn, Ga, In, Sb, Ge, Sn, and Pb, fluorides of Mg, Ce, Ca, etc., nitrides of Si, Al, Ta, B, etc., borides of Ti, etc., carbides of B, etc., and boron and carbon, and the main component has a composition approximating one of, for example, $CeO_2$, $La_2O_3$, $SiO$, $SiO_2$, $In_2O_3$, $Al_2O_3$, $GeO$, $GeO_2$, $PbO$, $SnO$, $SnO_2$, $Bi_2O_3$, $TeO_2$, $WO_2$, $WO_3$, $Ta_2O_5$, $Sc_2O_3$, $Y_2O_3$, $TiO_2$, $ZrO_2$, $CdS$, $ZnS$, $CdSe$, $ZnSe$, $In_2S_3$, $In_2Se_3$, $Sb_2S_3$, $Sb_2Se_3$, $Ga_2S_3$, $Ga_2Se_3$, $MgF_2$, $CeF_3$, $CaF_2$, $GeS$, $GeSe$, $GeSe_2$, $SnS$, $SnSe$, $PbS$, $PbSe$, $Bi_2Se_3$, $Bi_2S_3$, $TaN$, $Si_3N_4$, $AlN$, $Si$, $TiB_2$, $B_4C$, $SiC$, $B$ and $C$.

Among these materials, nitrides do not have so high a surface reflectivity and can produce a stable film, and a composition approximating $TaN$, $Si_3N_4$ or $AlN$ is preferable with respect to rigidity. Preferable oxides have a composition approximating to $Y_2O_3$, $Sc_2O_3$, $CeO_2$, $TiO_2$, $ZrO_2$, $In_2O_3$, $Al_2O_3$, $SnO_2$ or $SiO_2$ Amorphous materials of Si or C containing hydrogen are also preferable. By formation of a protective film as mentioned above, an increase in noise by deformation of a recording film at recording and rewriting can be prevented.

When recording is carried out by phase transition (change), it is preferable to crystallize the entire surface of a recording film in advance, but in the case of a substrate composed of an organic material, it is impossible to bring the substrate to a high temperature, and thus crystallization must be carried out in another manner. That is, it is preferable that crystallization is carried out by exposure to UV light, together with heating, exposure to light from a flash lamp, exposure to a high power gas laser, or a combination of exposure to laser beam and heating, etc. In the case of exposure to light from a gas laser, a good crystallizing efficiency can be obtained with a light spot diameter (half-width) of 5 μm to 5 mm. Crystallization may be carried out only on the recording track, while keeping the intertrack spaces in an amorphous state. It is also possible to record on a recording thin film in an amorphous state by crystallization.

When a thin film is exposed to light, the reflected light is generally a superposition of a reflected light from the thin film surface and another reflected light from the back side of the thin film, and thus undergoes an interference. When a signal is read through changes in the reflectivity, the effect of interference is increased by providing a reflecting (absorbing) layer near the recording film, and consequently the read-out signal can be intensified. To further increase the effect of interference, it is preferable to provide an intermediate layer between the recording film and the reflecting (absorbing) layer. The intermediate layer is also effective for preventing mutual diffusion between the recording film and the reflecting layer at the recording and rewriting. It is preferable to use a material less capable of absorbing the read-out light in the intermediate layer. It is also preferable that the intermediate layer has a thickness of 3 nm to 400 nm, selected so that the reflectivity of the recording member can become a minimum at the wavelength of read-out light in a recorded or erased state. The reflecting layer can be formed between the recording film and the substrate, or on the opposite sides of the recording film. A particularly preferable thickness of the intermediate layer is in a range of 5 nm to 40 nm. It is also preferable to form a protective layer composed of the aforementioned inorganic material on the side of the reflecting layer opposite to the intermediate layer.

It is preferable to form a reflection-preventing layer capable of decreasing the reflectivity of at least one of recording light, erasing light and read-out light on the light-incoming side of the recording film. The reflection-preventing layer may also serve to act as a protective layer for the recording film, or a protective layer may be formed between the reflection-preventing layer and the recording film. It is preferable that the coefficient of thermal expansion is changed successively in the order of recording layer-protective layer-reflection-preventing layer-substrate or adhesive or gas, and even in case that only one of the protective layer and the reflection-preventing layer is formed or in case that the protective layer and the reflection-preventing layer are each composed of double or multiple layers, it is preferable that the coefficient of thermal expansion is changed successively in this order.

The present recording film can be dispersed in the oxides, fluorides, nitrides, organic materials, etc., mentioned above to be applicable as a protective layer, by co-vapor deposition or cosputtering, whereby in some cases the light absorption coefficient can be adjusted or the reproduced signal intensity can be increased. A preferable mixing ratio is such that a proportion of oxygen, fluorine, nitrogen, and carbon in the entire film be 40 at. % or less. By making a composite film in this manner, usually the crystallization speed is lowered and the sensitivity is lowered. However, the sensitivity is increased by making a composite film with an organic material.

Preferable ranges for the thickness of the individual members are as follows:
Recording film: for a monolayer structure film, 60 to 350 nm, particularly preferably 180 to 300 nm with respect to the reproduced signal intensity; for two or more layers-structure film containing a reflecting layer: 15 to 50 nm;
Protective layer of inorganic material: 5 nm to 200 nm; in the case of protection by a substrate of inorganic material itself, 0.1 to 20 mm;
Protective layer of organic material: 10 nm to 10 nm;
Intermediate layer: 3 to 400 nm;
Light-reflecting layer: 5 to 300 nm The foregoing individual layers can be formed by vacuum evaporation, evaporation in a gas, sputtering, ion beam sputtering, ion beam deposition, ion plating, electron beam deposition, casting, spin coating, plasma polymerization, etc. upon proper selection.

In the present recording film, it is not always necessary to utilize a change between the amorphous state and the crystalline state in recording, but it is possible to utilize a change in the optical property by any change in the atomic configuration.

The present recording member can be used not only in a disk form, but also in a tape form, a card form or in any other form.

The present information recording thin film has a high crystallization speed, a high stability of amorphous state, a high absorbability of semiconductor laser beam, a high reproduced signal intensity and a high oxidation resistance, and thus has good recording and erasing characteristics, a high sensitivity and a good stability of the recorded state.

The present invention will be described in detail below, referring to Examples.

EXAMPLE 1

Figure 3:
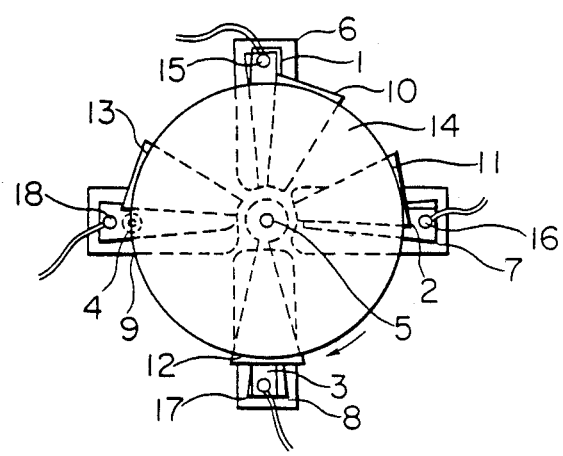
FIG. 3 shows an internal structure of a vacuum evaporation equipment for use in preparation of the present recording member.

A UV light curing resin replica layer of tracking grooves also serving as a protective layer was formed on the surface of a disk form, chemically reinforced glass plate. The glass disk was 13 cm in diameter and 1.2 mm thick, one track was divided into 32 sectors, and track addresses and sector addresses were formed in the form of concave and convex pits at the individual intermediate summit parts between the grooves at the starting points of the individual sectors (these parts will be hereinafter referred to as "headers"). At first a $Si_3N_4$ layer, about 100 nm thick, as a reflection-preventing layer serving also as a protective layer was formed on a substrate 14 by magnetron sputtering. Then, the substrate was disposed in a vacuum evaporation apparatus having an internal structure as shown in FIG. 3, and four evaporation sources 1, 2, 3 and 4 were provided in the evaporation apparatus. Three of the evaporation sources were evaporation boats by resistance heating and one was an electron beam evaporation source. These boats and electron beam evaporation source were provided under parts on the substrate 14 destined to record information and substantially on a circumference concentric with the center axis of rotation of the substrate. Ge and Te were placed in two evaporation boats, respectively, and Tl was placed in the electron beam evaporation source. Between the individual boats and the substrate there were provided masks 6, 7, 8 and 9 having a sector slit and shutters 10, 11, 12 and 13. The substrate 14 was set to rotate at 120 rpm, while an electric current was passed to the individual boat and a electron beam was irradiated onto the electron beam evaporation source to evaporate the source materials.

The evaporating rates from the individual evaporation sources were detected by quartz-crystal type film thickness monitors 15, 16, 17 and 18 to control the electric current thereby to make the evaporation rates constant.

As shown in FIG. 1, a recording film 21 having the composition of $Tl_5Ge_{45}Te_{50}$ was vapor deposited to a film thickness of about 250 nm on the $Si_3N_4$ layer 20 on the substrate 19.

The $Si_3N_4$ layer with an appropriate film thickness can serve as a reflection-preventing layer to the semiconductor laser beam, because its refractive index is higher than that of the substrate.

The film thickness was such that the light reflected on the interface of the recording film with the substrate-side protective layer interferred with the light reflected on the back side of the recording film and the reflectivity became substantially minimal at the wavelength of laser beam used for the read-out when the recording film was in an amorphous state or in a poorly crystallized state. Then, a protective layer 22 having a composition substantially equal to $Si_3N_4$ was successively formed to a film thickness of about 100 nm thereon also by magnetron sputtering. Likewise, a protective layer 20' having a composition substantially equal to $Si_3N_4$ on a similar substrate 19', and a recording film 21' having the composition of $Tl_5Ge_{45}Te_{50}$ and a protective layer 22' having a composition substantially equal to $Si_3N_4$ were successively vapor-deposited thereon. UV light curing resin protective layers 23 and 23' were formed to a film thickness of about 50 μm by coating on the respective outermost vapor-deposited layer of the thus obtained two substrates 19 and 19', and the substrates 19 and 19' were joined together by pasting through an organic adhesive layer 24 so that the UV light curing resin layers 23 and 23' could be faced inwardly. In this manner, a disk could be prepared.

The thus prepared disk was heated at 150° C for about one hour, and then exposed to argon ion laser beams (wavelength:488 nm) condensed by lenses having a numerical aperture of 0.05 at both sides of the disk while rotating and radially moving the disk, thereby thoroughly crystallizing the recording films 21 and 21'.

Recording was carried out in the following manner:

The disk was rotated at 1,200 rpm, and one of the recording films was exposed to a beam of semi-conductor laser (wavelength: 820 nm), kept at a non-recording power level and condensed by a lens in the recording head, through the substrate. The reflected light was detected to drive the head so that the center of the light spot could always fall onto the intermediate part between the tracking grooves, whereby the influence of noises generated from the grooves could be prevented. Automatic focusing was carried out so that the focus could fall on the recording film while conducting the tracking in this manner, and recording was carried out by intensifying the laser power and returning it to the original level according to information signals. Recording was also carried out by jumping into another groove, when required.

By the foregoing recording, a change of reflectivity was brought about, which seemed to be due to a change into an amorphous state in the recording film. In the foregoing recording film, the recording could be erased by exposure to a recording light spot with a reduced power or another laser beam whose length in the track direction was longer than the recording light spot and whose extension in the adjacent track direction was substantially equal to the recording light spot. When the pit distance between the nearest pits, which expressed an address, was ½ to 2 times the length in the track direction of the erasing light spot, the address of tracks or sectors could be read even by the erasing light spot.

It was preferable that the length of pits which expressed the address was at least ½ of the length in the track direction of the erasing light spot. This was also true of other pits provided on the header. Recording and erasing could be carried out in repetitions of at least $3 \times 10^5$. Without the $Si_3N_4$ layers over and below the recording films, the noise was slightly increased after a few repetitions of recording and erasing.

Read-out was carried out in the following manner.

The disk was rotated at 1,200 rpm, and the intensity of reflected light of semiconductor laser beam for reading with such a low power not enough to effect recording and erasing was detected to reproduce information, while conducting the tracking and autofocusing in the same manner as in the recording. In this Example, reproduced signal power of about 100 mV was obtained. The recording film according to this Example had good oxidation resistance. For example, the recording film without formation of the $Si_3N_4$ protective layer was not substantially oxidized even if placed at 60° C. and a relative humidity of 95%.

In the foregoing recording film of Tl—Ge—Te system, the crystallization temperature and the necessary irradiation time for erasing were changed as follows, when the Tl content was changed while keeping a ratio of Ge to Te constant.

|  | Necessary irradiation time for erasing | Crystallization temperature |
|---|---|---|
| Y = 0 | 1.0 μs | 200° C. |
| Y = 0.5 | 0.8 μs | 190° C. |
| Y = 1 | 0.5 μs | 180° C. |
| Y = 2 | 0.4 μs | 175° C. |
| Y = 5 | 0.3 μs | 170° C. |
| Y = 10 | 0.2 μs | 160° C. |
| Y = 15 | 0.2 μs | 155° C. |
| Y = 25 | 0.1 μs | 150° C. |
| Y = 30 | 0.1 μs | 130° C. |
| Y = 35 | 0.1 μs | 100° C. |
| Y = 50 | 0.1 μs | 80° C. |

Deterioration by oxidation when left standing for a time before the deposition of the protective layer thereon was remarkable when the Tl content exceeded 30 at. %.

In case of too small Y, the recording film had a prolonged necessary irradiation time for erasing as a disadvantage, whereas in case of too large Y, it had a low crystallization time as a disadvantage.

When at least one element of halogens and alkali metals was added in place of a portion or all of Tl, quite similar characteristics were obtained. I was particularly preferable among the halogens F, Cl, Br and I, and Cl was next preferable. Na was particularly preferable among the alkali metals Li, Na, K, Rb and Cs, and K was next preferable.

In the foregoing recording film of Tl—Ge—Te system, the necessary irradiation time for erasing and the possible number of rewritings were changed as follows, when the Ge content and the Te content were changed while keeping the Tl content constant at 5 at. %.

| α | β | Necessary irradiation time for erasing | Possible number of rewritings |
|---|---|---|---|
| 10 | 85 | 10 μs | $10^6$ |
| 20 | 75 | 5 μs | $10^6$ |
| 41 | 54 | 1 μs | $10^6$ |
| 43 | 52 | 0.8 μs | $10^6$ |
| 44 | 51 | 0.3 μs | $10^6$ |

| α | β | Necessary irradiation time for erasing | Possible number of rewritings |
|---|---|---|---|
| 46 | 49 | 0.2 μs | $3 \times 10^5$ |
| 47.5 | 47.5 | 0.1 μs | $10^2$ |
| 49 | 46 | 0.2 μs | $3 \times 10^5$ |
| 51 | 44 | 0.5 μs | $10^5$ |
| 55 | 40 | 0.8 μs | $2 \times 10^4$ |
| 60 | 35 | 1 μs | $10^4$ |
| 65 | 30 | 10 μs | $10^3$ |

In case that α was less than 10, the crystallization temperature was low (the amorphous state was unstable). In case α exceeded 65, recording was difficult to carry out. In case that α and β were either too large or too small, the necessary irradiation time for erasing was prolonged and the possible number of rewritings was smaller as disadvantages. In such a composition where α=β, the possible number of rewritings became extremely small.

When at least one element of Sb, Sn, As, Pb, Bi, Zn, Cd, Si, Al, Ga and In as the element represented by C was added in place of a portion or all of Ge, quite similar characteristics were obtained. Among these elements, Sb was particularly preferable, Sn was next preferable, then As, In and Si were preferable, and Pb, Bi and Ga were then preferable. With an increasing amount of Sn, decrease in the crystallization temperature became remarkable. When more than 5 at. % of Sb, etc. was added, the recording sensitivity was effectively increased. When the recording sensitivity was also taken into account, a particularly preferable ratio of Sb or Bi to Te by atom was in a range of 1:0.4 to 1:1.6, that of Si to Te was 1:1.2 to 1:2.5, that of As to Te was 1:0.9 to 1:4, and that of In to Te was 1:0.5 to 1:2.

In the foregoing recording film of Tl—Ge—Te system, the necessary laser beam power for recording and reproduced signal intensity (output voltage) were changed as follows with respect to the amount added X at. %, when Co was added in place of Tl (the Tl content was 0 at. %) while keeping a ratio of Ge to Te constant.

| | Recording laser power | Output voltage |
|---|---|---|
| X = 0 | 17 mW | 200 mV |
| X = 0.5 | 16 mW | 200 mV |
| X = 1 | 14 mW | 220 mV |
| X = 5 | 12 mW | 220 mV |
| X = 10 | 10 mW | 200 mV |
| X = 20 | 9 mW | 180 mV |
| X = 30 | 12 mW | 150 mV |
| X = 40 | failed to record | |
| X = 50 | " | |

In the foregoing recording film of Tl—Ge—Te system, the necessary laser beam power for recording and the reproduced signal intensity (output voltage) were changed as follows in respect to the amount added X at. %, when Co was added while keeping a ratio of Tl to Ge to Te constant.

| | Recording laser power | Output voltage |
|---|---|---|
| X = 0 | 16 mW | 220 mV |
| X = 0.5 | 15 mW | 220 mV |
| X = 1 | 13 mW | 240 mV |
| X = 5 | 11 mW | 240 mV |
| X = 10 | 10 mW | 220 mV |
| X = 20 | 9 mW | 200 mV |
| X = 30 | 12 mW | 170 mV |
| X = 40 | failed to record | |
| X = 50 | " | |

In case of too small x, the necessary laser beam power for recording was higher as a disadvantage, whereas in case of too large X, the reproduced signal intensity was smaller as a disadvantage.

When at least one element of Ni, Ti, V, Cr, Mn, Cu, Pd, Rh, Zr, Nb, Mo, Ag, Pt, Os, Ir, Hf, Ta, W, Re and Au was added in place of a portion or all of Co, similar characteristics were obtained. Among these elements, Ti was particularly preferable, Ni was next preferable, then V and Cr were preferable, and Pd, Zr, Nb and Mn were next preferable.

When 1 to 30 at. % of Se or S was added in place of a portion or all of Co, the oxidation resistance could be effectively increased without any adverse effect on the recording and erasing characteristics. In addition, B, C, N, P, 0, Hg, inert gas elements, alkaline earth metal elements, lantanide elements, and actinide elements could be added thereto. Addition of these elements such as Se, etc. was effective for recording films containing no Tl.

Preferable film thickness of the recording film was in ranges of 80 to 150 nm and 180 to 300 nm, where the change of reflectivity by recording became larger owing to the effect of light interference. In a range of 180 to 300 nm, the recording sensitivity was higher. In a range of 80 to 150 nm, the SN ratio was higher. Recording and reproduction were also possible in a range of 15 to 500 nm.

In place of $Si_3N_4$ as a protective film, SiO, $SiO_2$, $Y_2O_3$, $CeO_2$, $ZrO_2$, etc., nitrides such as TaN, AlN, etc., sulfides such as $Sb_2S_3$, ZnS etc., fluorides such as $CeF_3$, etc., and compositions similar, to amorphous Si, $TiB_2$, $B_4C$, B, C, etc. could also be used.

In a recording film of Ge—Te system, the necessary irradiation time for erasing and the possible number of rewritings were changed as follows, when the Ge content and the Te content were changed.

| α | β | Necessary irradiation time for erasing | Possible number of rewritings |
|---|---|---|---|
| 20 | 80 | 20 μs | $10^6$ |
| 42 | 58 | 4 μs | $10^6$ |
| 46 | 54 | 1 μs | $10^6$ |
| 49 | 51 | 0.5 μs | $3 \times 10^5$ |
| 50 | 50 | 0.2 μs | $10^2$ |
| 51 | 49 | 0.5 μs | $3 \times 10^5$ |
| 54 | 46 | 1 μs | $10^5$ |
| 58 | 42 | 5 μs | $5 \times 10^4$ |
| 80 | 20 | failed to record | |

In case that α and β were either too large or too small, the necessary irradiation time for erasing was prolonged and the possible number of rewritings became smaller as disadvantages. In the composition where α=β, the possible number of rewritings became extremely small. When not more than 30 at. % of at least one of the elements represented by A, not more than 25 at. % of at least one of the elements represented by B, and not more than 65 at. % of at least one of the elements represented by C were added, while keeping the given ratio of α to β of the thin film, good characteristics could be obtained.

EXAMPLE 2

Recording films having a film thickness of 100 nm, represented by $C_ZTe$ were prepared in the same manner as in Example 1, where C was one of Sb, Sn, As, Pb, Bi, Zn, Cd, Si, Al, Ga and In, and a plurality of these elements could be contained. Among these elements, Sb was particularly preferable due to the high crystallization temperature. Sn was next preferable, then As, In and Si were preferable, and Pb, Bi and Ga were then preferable. When the recording sensitivity was also taken into account, a preferable ratio of Sb or Bi to Te by atom was in a range of 1:04 to 1:1.4, that of Sn or Si to Te was 1:1.2 to 1:2.5, that of As to Te was 1:0.9 to 1:4, and that of In to Te was 1:0.5 to 1:2.

EXAMPLE 3

Figure 2:
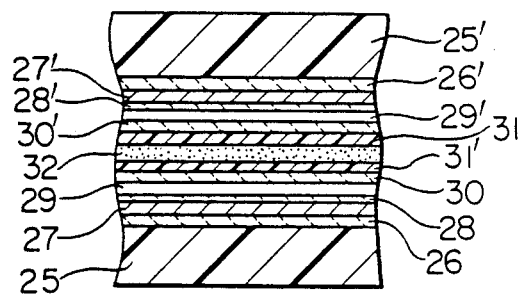

A polycarbonate plate having tracking grooves on the surface, formed by injection molding, was used as a substrate 25, as shown in FIG. 2, and a protective film 26, 40 nm thick, having a composition substantially equal to $SiO_2$ was formed thereon by sputtering. Then, a recording film 27, 30 nm thick, having a composition of $Tl_{10}Ge_{47}Te_{43}$ was formed thereon. Successively, an intermediate layer 28, 20 nm thick, having a composition substantially equal to $SiO_2$, then a reflecting layer 29, 60 nm thick, having a composition of $Bi_7Sb_3$, and a protective layer 30, 40 nm thick, having a composition substantially equal to $SiO_2$ were formed thereon. Likewise, another substrate 25' with various similar layers 26', 27', 28', 29' and 30' thereon was prepared, and polyimides 31 and 31', each about 0.5 μm thick, were formed by sputtering on the outermost $SiO_2$ layers 30 and 30' of both substrates, respectively, and a disk was prepared by joining the two substrates together by pasting with a hot melt adhesive 32 containing a black pigment, so that the polyimide layers could be faced inwardly. When polyimide layers were further formed on the outside surfaces of polycarbonate plates by sputtering, a more stable disk could be obtained.

Crystallization, recording, erasing and read-out were carried out in the same manner as in Example 1.

Other inorganic transparent materials such as $GeO_2$, $Al_2O_3$, $CeO_2$, $Y_2O_3$, SiO, AlN, TaN, etc. as mentioned to be applicable as a protective layer in Example 1, or an organic material layer could be used for the intermediate layer in place of $SiO_2$. When the intermediate layer had a film thickness of 3 to 40 nm, a mutual diffusion between the recording film and the reflecting layer could be prevented at recording and rewriting, but optically it could be regarded that there was substantially no intermediate layer. That is, a dependence of reflectivity on wavelength due to the light interference was similar to that of a two-layer structure of recording film and reflecting layer.

When the reflecting layer also underwent an atomic configuration change at the recording, the reproduced signal was intensified slightly.

A portion or all of the individual elements represented by B and C contained in the recording film could be replaced with at least one of other elements in the same groups. At least one of the elements in groups A, such as Co, etc. could be added in an amount of not more than 30 at. % without any trouble. However, not more than 20 at. % thereof was preferable with respect to the SN ratio.

When the film thickness of a recording film was in a range of 15 to 50 nm, and the recording film was in an amorphous state, the reflectivity was lowered by the interference, and a more intensified reproduced signal could be obtained. The film thickness of a reflecting layer was in a range of preferably 5 to 300 nm, more preferably 40 to 200 nm. By providing a reflecting layer, a more intensified reproduced signal could be obtained even if the film thickness of a recording film was in a lower range than that of the monolayer, as described above, and thus good characteristics could be obtained even in a composition range where the absorption coefficient of a recording film was larger than that of the monolayer.

When the film thickness of a recording film and an intermediate layer was changed, the wavelength, at which the reflectivity of read-out light became minimum by the interference, was changed. Since the necessary minimum reflectivity for autofocussing or tracking was 10 to 15%, it was necessary that the minimum value was on a longer or shorter wavelength side than the read-out light wavelength, when the minimum value of the reflectivity was less than the aforementioned value. When the minimum value was made to be on the shorter wavelength side, the film thickness of a recording film could be made smaller, and an energy loss by heat conduction could be prevented. When the minimum value was made to be on the longer wavelength side on the other hand, the film thickness could be larger. This was preferable from the viewpoints of recording film life and prevention of noise generation at the recording and rewriting.

As a material for the reflecting layer, many semiconductors, semi-metals, metals or their mixtures or their compounds such as Bi, $Bi_2Te_3$, Te, Sn, Sb, Al, Au, Pb, etc. could be used in place of Bi—Sb.

The recording film of Example 3 also had as good an oxidation resistance as that of Example 1, and even if there were pinholes on the protective layer, no further oxidation proceeded in the neighborhood of the pinholes.

As described in detail above, an information-recording member having good reproducibility, good recording and reproducing characteristics and high stability can be obtained by simple method in the present invention. Rewriting of recording can be made in a large number of repetitions.

What is claimed is:

1. An information-recording thin film capable of changing an atomic configuration upon exposure to a recording beam, formed on a substrate directly or through a protective layer composed of at least one of inorganic materials and organic materials, an average composition in the film thickness direction of the information-recording thin film being represented by the following general formula:

$$A_XB_YC_ZGe_\alpha Te_\beta$$

wherein X, Y, Z, α and β are in a range of $1 \leq X < 30$, $0 \leq Y \leq 25$, $40 < Z+\alpha \leq 65$ and $35 \leq \beta < 60$ in atomic percentage; C is at least one element of Sb and Sn; B is at least one element of Tl, halogen elements and alkali metal elements; and A is Se; and wherein said information-recording thin film has a thickness of 15 to 350 nm.

2. An information-recording thin film according to claim 1, wherein the element represented by C in the general formula is Sb.

3. An information-recording thin film according to claim 1, wherein the element represented by C in the general formula is Sn.

4. An information-recording thin film according to claim 1, wherein said information-recording thin film is capable of undergoing a change between the amorphous and crystalline states upon exposure to a recording beam.

5. An information-recording thin film according to claim 4, wherein said information-recording thin film is in the crystalline state and is capable of undergoing a change to the amorphous state upon exposure to a recording beam.

6. An information-recording thin film according to claim 1, wherein said information-recording thin film is capable of undergoing a phase transition without substantial deformation of said information recording thin film.

7. An information-recording thin film according to claim 1, wherein said information-recording thin film has a thickness of 15 to 50 nm.

8. An information-recording thin film according to claim 1, wherein said information-recording thin film has a thickness of 65 to 350 nm.

9. An information-recording thin film according to claim 1, wherein B is at least one element selected from the group consisting of Tl, I and Na.

10. An information-recording thin film capable of changing an atomic configuration upon exposure to a recording beam, formed on a substrate directly or through a protective layer composed of at least one of inorganic materials and organic materials, an average composition in the film thickness direction of the information-recording thin film being represented by the following general formula:

$$A_X B_Y C_Z Ge_\alpha Te_\beta$$

wherein X, Y, Z, $\alpha$ and $\beta$ are in a range of $1 \leq X < 30$, $0 \leq Y \leq 30$, $0 \leq Z \leq 65$, $0 \leq \alpha \leq 65$, $10 \leq Z+\alpha \leq 60$ and $35 \leq \beta \leq 60$ in atomic percentage; C is at least one element of Sb and Sn; B is at least one element of Tl, halogen elements and alkali metal elements; and A is at least one element selected from the group consisting of S, Co, Ni, Ti, V, Cr, Mn, Cu, Pd, Rh, Zr, Nb, Mo, Ag, Pt, Os, Ir, Hf, Ta, W, Re and Au; and wherein said information-recording thin film has a thickness of 15 to 350 nm.

11. An information-recording thin film according to claim 10, wherein the element represented by C in the general formula is Sb.

12. An information-recording thin film according to claim 10, wherein the element represented by C in the general formula is Sn.

13. An information-recording thin film according to claim 10, wherein said information-recording thin film is capable of undergoing a change between the amorphous and crystalline states upon exposure to a recording beam.

14. An information-recording thin film according to claim 13, wherein said information-recording thin film is in the crystalline state and is capable of undergoing a change to the amorphous state upon exposure to a recording beam.

15. An information-recording thin film according to claim 10, wherein said information-recording thin film is capable of undergoing a phase transition without substantial deformation of said information-recording thin film.

16. An information-recording thin film according to claim 10, wherein said information-recording thin film has a thickness of 15 to 50 nm.

17. An information-recording thin film according to claim 10, wherein said information-recording thin film has a thickness of 65 to 350 nm.

18. An information-recording thin film according to claim 10, wherein B is at least one element selected from the group consisting of Tl, I and Na.

19. An information recording thin film according to claim 10, wherein A is at least one element selected from the group consisting of S and Co.

20. An information-recording thin film according to claim 11, wherein A is at least one element selected from the group consisting of S and Co.

21. An information-recording thin film according to claim 12, wherein A is at least one element selected from the group consisting of S and Co.

22. An information-recording thin film which comprises a recording film capable of changing an atomic configuration upon exposure to a recording beam, formed on a substrate directly or through a protective layer composed of at least one of inorganic materials and organic materials and a reflecting layer provided over the recording film through an intermediate layer composed of at least one of inorganic materials and organic materials, an average composition in the film thickness direction of the recording film being represented by the following general formula:

$$C_Z Ge_\alpha Te_\beta$$

wherein Z, $\alpha$ and $\beta$ are in a range of $5 \leq Z \leq 65$, $40 < Z+\alpha \leq 65$ and $35 \leq \beta < 55$ and C is at least one element selected from the group consisting of Sb, Sn, As, Pb, Bi, Zn, Cd, Si, Al, Ga and In.

23. An information-recording thin film according to claim 22, wherein the element represented by C is Sb or Bi and a ratio of $\beta$ to Z is $0.4 \leq \beta/Z \leq 1.4$.

24. An information-recording thin film according to claim 22, wherein the element represented by C is Sn or Si and a ratio of $\beta$ to Z is $1.2 \leq \beta/Z = 2.5$.

25. An information-recording thin film according to claim 22, wherein the element represented by C is Sb or Sn.

26. An information-recording thin film according to claim 22, wherein the intermediate layer has a thickness of 3 nm to 400 nm.

27. An information-recording thin film according to claim 22, wherein the intermediate layer is composed of inorganic materials.

28. An information-recording thin film according to claim 22, wherein the intermediate layer is made of at least one of oxides, nitrides, sulfides and fluorides.

29. An information-recording thin film according to claim 22, wherein the recording film has a thickness of 15 nm to 50 nm.

30. A method for recording information which comprises a step of preparing an information-recording thin film capable of changing an atomic configuration upon exposure of a recording beam, formed on a substrate directly or through a protective layer composed of at least one of inorganic materials and organic materials, an average composition in the film thickness direction of the information-recording thin film being represented by the following general formula:

$$A_X B_Y C_Z Ge_\alpha Te_\beta$$

wherein X, Y, Z, α and β are in a range of $1 \leq X < 30$, $0 \leq Y \leq 30$, $0 \leq Z \leq 65$, $0 \leq \alpha \leq 65$, $10 \leq Z+\alpha \leq 65$ and $35 \leq \beta \leq 60$ in atomic percentage; C is at least one element of Sb and B is at least one element of Tl, halogen elements and alkali metal elements; and A is at least one element selected from the group consisting of S, Se, Co, Ni, Ti, V, Cr, Mn, Cu, Pd, Rh, Zr, Nb, Mo, Ag, Pt, Os, Ir, Hf, Ta, W, Re and Au; and wherein said information recording thin film has a thickness of 15 to 350 nm; and a step of exposing the information-recording thin film to a recording beam.

31. A method according to claim 30, wherein the information recording thin film in crystalline and undergoes a change in atomic configuration by exposure to a recording beam, thereby taking an amorphous state.

32. A method according to claim 30, wherein the element represented by C in the general formula is Sb.

33. A method according to claim 30, wherein the element represented by C in the general formula is Sn.

34. A method according to claim 30, wherein said step of exposing the information-recording thin film to a recording beam causes said information-recording thin film to undergo a change between the amorphous and crystalline states.

35. A method according to claim 30, wherein said step of exposing the information-recording thin film to a recording beam causes said information-recording thin film to undergo a phase transition with no substantial deformation of the information-recording thin film.

36. A method according to claim 30, wherein said information-recording thin film has a thickness of 15 to 50 nm.

37. A method according to claim 30, wherein said information-recording thin film has a thickness of 60 to 350 nm.

38. A method for recording information which comprises a step of preparing an information-recording thin film capable of changing an atomic configuration upon exposure to a recording beam, formed on a substrate directly or through a protective layer composed of at least one of inorganic materials and organic materials, an average composition in the film thickness direction of the information-recording thin film being represented by the following general formula:

$A_X B_Y C_Z Ge_\alpha Te_b$ wherein X, Y, Z, α and β are in a range of $1 \leq X < 30$, $0 \leq Y \leq 30$, $0 \leq Z \leq 65$, $0 \leq \alpha \leq 65$, $10 \leq Z+\alpha \leq 65$ and $35 \leq b \leq 60$ in atomic percentage; C is at least one element of Sb and Sn; B is at least one element of Tl, halogen elements and alkali metal elements; and A is at least one element selected from the group consisting of S Co, Ni, Ti, V, Cr, Mn, Cu, Pd, Rh, Zr, Nb, Mo, Ag, Pt, Os, Ir, Hf, Ta, W, Re and Au; and wherein said information-recording thin film has a thickness of 15 to 350 nm; and a step of exposing the information-recording thin film to a recording beam.

39. An information-recording thin film according to claim 38, wherein the information-recording thin film is crystalline and undergoes a change in atomic configuration by exposure to a recording beam, thereby taking an amorphous state.

40. An information-recording thin film according to claim 38, wherein the element represented by C in the general formula is Sb.

41. An information-recording thin film according to claim 38, wherein the element represented by C in the general formula is Sn.

42. An information-recording thin film according to claim 38, wherein said step of exposing the information-recording thin film to a recording beam causes said information-recording film to undergo a change between the amorphous and crystalline state.

43. An information-recording thin film according to claim 38, wherein said step of exposing the information-recording thin film to a recording beam causes said information-recording thin film to undergo a phase transition with no substantial deformation of the information-recording thin film.

44. An information-recording thin film according to claim 38, wherein said information-recording thin film has a thickness of 15 to 50 nm.

45. An information-recording thin film according to claim 38, wherein said information-recording thin film has a thickness of 60 to 350 nm.

46. A method according to claim 38, wherein A is at least one element selected from the group consisting of S and Co.

47. A method according to claim 39, wherein A is at least one element selected from the group consisting of S and Co.

48. A method according to claim 40, wherein A is at least one element selected from the group consisting of S and Co.

49. A method according to claim 41, wherein A is at least one element selected from the group consisting of S and Co.

50. A method for recording information which comprises a step of preparing an information-recording thin film capable of changing an atomic configuration upon exposure to a recording beam, formed on a substrate directly or through a protective layer composed of at least one of inorganic materials and organic materials, an average composition in the film thickness direction of the information-recording thin film being represented by the following general formula:

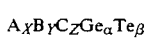

$A_X B_Y C_Z Ge_\alpha Te_\beta$ wherein X, Y, Z, α and β are in ranges of $1 \leq X \leq 25$, $1 \leq Y \leq 20$, $0 \leq Z \leq 65$, $0 \leq \alpha \leq 65$, $10 \leq Z+\alpha \leq 65$ and $35 \leq \beta \leq 60$ in atomic percentage, and a ratio of Ge to Te by atom is in a range of 1:0.85 to 1:1.2; C is at least one element of Sb, Sn, Pb, Bi, Zn, Cd, Si, Al, Ga and In; B is at least one element of Tl, halogen elements and alkali metal elements; and A is at least one element selected from the group consisting of S, Se, Co, Ni, Ti, V, Cr, Mn, Cu, Pd, Rh, Zr, Nb, MO, Ag, Pt, Os, Ir, Hf, Ta, W, Re and Au; and wherein said information-recording thin film has a thickness of 15 to 350 nm; and a step of exposing the information-recording thin film to a recording beam.

51. A method according to claim 50, wherein A is Se and $40 < Z+\alpha \leq 60$ in atomic percentage.

52. A method according to claim 50, wherein A is at least one element selected from the group consisting of S, Co, Ni, TI, V, Cr, Mn, Cu, Pd, Rh, Zr, Nb, Mo, Ag, Pt, Os, In, Hf, Ta, W, Re and Au.

* * * * *